US010459923B2

(12) United States Patent
Murphy (10) Patent No.: US 10,459,923 B2
(45) Date of Patent: Oct. 29, 2019

(54) SYSTEM AND METHOD FOR HANDLING TOP COUNT QUERIES FOR ARBITRARY, SELECTABLE INTERVALS RELATING TO A LARGE, STREAMED DATA SET (71) Applicant: Arbor Networks, Inc., Burlington, MA (US)

(72) Inventor: Frank P. Murphy, Ann Arbor, MI (US)

(73) Assignee: Arbor Networks, Inc., Westford, MA (US)

(*) Notice: Subject to any disclaimer, the term of this patent is extended or adjusted under 35 U.S.C. 154(b) by 296 days.

(21) Appl. No.: 15/404,922

(22) Filed: Jan. 12, 2017

(65) Prior Publication Data
US 2018/0196852 A1 Jul. 12, 2018

(51) Int. Cl.
*G06F 16/00* (2019.01)
*G06F 16/2455* (2019.01)

(52) U.S. Cl.
CPC .............. *G06F 16/24568* (2019.01)

(58) Field of Classification Search
CPC .......... G06F 17/3053; G06F 17/30864; G06F 17/30339; G06F 17/30477; G06F 17/30554; G06F 17/30979; G06F 17/30312; G06F 17/30575; G06F 17/30973; G06F 17/30324; G06F 17/30345; G06F 17/30463; G06F 17/30536; G06F 17/30938; G06F 7/00; G06F 8/453; G06F 17/30442; G06F 17/30466; G06F 17/30489; G06F 17/3064; G06F 17/30867; G06F 17/30; G06F 17/30333; G06F 17/30545; G06F 17/30592; G06F 17/30643; G06F 17/30675; G06F 17/30958; G06F 17/3097; G06F 3/0685;
(Continued)

(56) References Cited

U.S. PATENT DOCUMENTS

2018/0129731 A1* 5/2018 Carmel ............. G06F 17/30675

OTHER PUBLICATIONS

Metwally, A., et al., Efficient Computation of Frequent and Top-k Elements in Data Streams, Department of Computer Science University of California, Santa Barbara, {metwally, agrawal, amr}@cs.ucsb.edu.

* cited by examiner

*Primary Examiner* — Yicun Wu
(74) *Attorney, Agent, or Firm* — Locke Lord LLP; Scott D. Wofsy; Christopher J. Capelli (57) ABSTRACT A system and method are provided for enabling querying of a large set, including accessing a data structure associated with a metadata parameter and configured to store partial information associated with the data set in a plurality of bins. Each bin, associated with a unique time interval, is configured to store a plurality of entries associated with identified respective members of the metadata parameter's that have a detection time included in the bin's time interval. Each entry has at least one of an updated maximum and minimum possible count value determined using a probabilistic algorithm. The method includes receiving a query having a requested time interval, selecting two or more bins f the data structure that in combination describe the requested time interval, selecting k entries from a combination of the entries in the selected bins based on at least one of an updated maximum and minimum possible count value associated with entries of the selected bins, and determining top-k data, the top-k data including identification of the selected k entries.

16 Claims, 8 Drawing Sheets

(58) Field of Classification Search
CPC .... G06F 17/00; G06F 17/18; G06F 17/30017;
G06F 17/30153; G06F 17/30286; G06F
17/30327; G06F 17/30386; G06F
17/30454; G06F 17/30501; G06F
17/30551; G06F 17/30598; G06F
17/30625; G06F 17/30687; G06F
17/30946; G06F 19/16; G06F 19/28;
G06F 19/705; G06F 19/707; G06F
21/552; G06F 2209/542; G06F 3/0604;
G06F 3/0647; G06F 7/22; G06F 7/24;
G06F 9/54; G06F 11/0706; G06F
11/0751; G06F 11/079; G06F 11/2025;
G06F 11/2028; G06F 11/2038; G06F
11/2097; G06F 11/3668; G06F 11/368;
G06F 17/2735; G06F 17/30011; G06F
17/301; G06F 17/30117; G06F 17/30138;
G06F 17/30159; G06F 17/30241; G06F
17/30306
See application file for complete search history.

Fig. 1

| RANK | ID | COUNT | ERROR |
|---|---|---|---|
| 1 | 10101010.10101010.10101010.10101010 | 445 | 0 |
| 2 | 10101010.10111111.10111111.10101010 | 355 | 0 |
| 3 | 10101111.11011111.10101010.10101010 | 372 | 2 |
| 4 | 11100010.10101110.10101111.10000010 | 244 | 2 |
| 5 | 00001010.00001010.00001010.00001010 | 213 | 1 |
| 6 | 10111011.11101010.11101010.11101010 | 89 | 2 |
| 7 | 10101010.10101010.10101010.10001010 | 78 | 2 |
| 8 | 10100000.11101000.10001010.10010010 | 67 | 1 |
| 9 | 10001110.10101010.10100010.10001010 | 54 | 5 |
| 10 | 10101110.10111010.10111110.11101010 | 43 | 8 |
| | | | |
| N | 10101010.10101010.11111011.10101010 | 12 | 6 |

|  | b = 1 | | |
|---|---|---|---|
| *i* | Value | C | R |
| = 1 | A | 21 | 0 |
| = 2 | B | 19 | 0 |
| = 3 | C | 15 | 0 |
| = 4 | D | 14 | 0 |
| = 5 | E | 4 | 1 |

$C_{1K}/N = 15/3 = 5$

|  | b = 2 | | |
|---|---|---|---|
| Value | C | R | |
| B | 15 | 0 | |
| F | 15 | 0 | |
| G | 12 | 0 | |
| E | 3 | 1 | |
| C | 2 | 1 | |

$C_{2K}/N = 12/3 = 4$

|  | b = 3 | | |
|---|---|---|---|
| Value | C | R | |
| D | 13 | 0 | |
| H | 11 | 0 | |
| J | 9 | 2 | |
| A | 8 | 2 | |
| B | 7 | 2 | |

SYSTEM AND METHOD FOR HANDLING TOP COUNT QUERIES FOR ARBITRARY, SELECTABLE INTERVALS RELATING TO A LARGE, STREAMED DATA SET

The present technology relates to methods and systems for handling top count queries for arbitrary, selectable intervals relating to a large, streamed data set, and, more particularly, methods and systems for handling the queries using probabilistic data about the large, streamed data set.

BACKGROUND OF THE INVENTION

Information can be culled from events that occur in relation to large, streamed data sets. However, it can be impracticable or impossible to store a streamed, large data set or associated event data, and similarly impracticable or impossible to determine the most frequently occurring elements (also referred to as top-k) within the large, streamed data set or its associated event data.

Conventional methods and systems employ probabilistic solutions to store selected event-data associated with large, streamed data sets. However, such conventional methods and systems do not enable handling querying about arbitrary, selectable intervals (e.g., time intervals) associated with the event data. For example, some conventional methods and systems have the capability of providing top-k information about the event data for infinite time intervals only.

Such conventional methods and systems have generally been considered satisfactory for their intended purpose. However, there is still a need in the art for handling top-k queries that request top-k information for an arbitrary, selectable interval (e.g., time interval) about event data associated with a large, streamed data set, including when the event data is stored using a probabilistic solution. The present disclosure provides a solution for these problems.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a computer-implemented method to enable querying of large sets of streamed data in another aspect, a system is provided that includes a memory configured to store instructions and a processor disposed in communication with the memory, wherein the processor upon execution of the instructions is configured to perform the method.

The method includes accessing a data structure configured to store partial information of interest associated with a large data set of data elements streamed over time.

The data structure is associated with a metadata parameter, the metadata parameter having a set of potential members, the data structure includes a plurality of bins, each bin associated with a unique time interval defined by an associated start time relative to a reference time and a time duration, and each bin is configured to store a plurality of entries associated with respective members of the metadata parameter's set.

Each entry has at least one of an updated maximum and minimum possible count value that are updated based on data elements of the data set that have an associated detection time when the data element was observed that corresponds to the bin's time interval. The maximum possible count value is a frequency count value that represents an estimated number of instances the associated member of the metadata parameter's set was observed in the time interval that corresponds to the bin. The minimum possible count value being the difference between the count value and an error value associated with the entry, wherein the error value represents an estimated error associated with determining the frequency count value.

The associated at least one of an updated maximum and minimum possible count value are determined using a probabilistic algorithm that accounts for errors introduced by storing entries associated with only a portion of data elements included in the large data set in the data structure.

The method further includes receiving a query having a requested time interval, selecting two or more bins of the data structure that in combination describe the requested time interval, selecting k entries from a combination of the entries in the selected bins based on at least one of the maximum and minimum possible count values associated with entries of the selected bins, and determining top-k data, the top-k data including identification of the selected k entries.

In accordance with another aspect of the disclose, a non-transitory computer readable storage medium and one or more computer programs embedded therein are provided, wherein the computer programs includes instructions, which when executed by a computer system, cause the computer system to access a data structure configured to store partial information of interest associated with a large, streamed data set of data elements.

The data structure is associated with a metadata parameter. The metadata parameter has a set of potential members, the data structure includes a plurality of bins, each bin is associated with a unique property interval defined by an associated start and end value, and each bin is configured to store a plurality of entries associated with respective members of the metadata parameter's set. Each entry has at least one of an updated maximum and minimum possible count value that are updated based on data elements of the data set that have an associated detection time when the data element was observed that corresponds to the bin's time interval. The maximum possible count value is a frequency count value that represents an estimated number of instances the associated member of the metadata parameter's set was observed in the time interval that corresponds to the bin. The minimum possible count value being the difference between the count value and an error value associated with the entry, wherein the error value represents an estimated error associated with determining the frequency count value.

The associated at least one of an updated maximum and minimum possible count value are determined using a probabilistic algorithm that accounts for errors introduced by storing entries associated with only a portion of data elements included in the large data set in the data structure.

The computer programs, when executed by a computer system, further cause the computer system to receive a query having a requested property interval, select two or more bins of the data structure that in combination describe the requested property interval, select k entries from a combination of the entries in the selected bins based on the at least one of the maximum and minimum possible count values associated with entries of the selected bins, and determine top-k data, the top-k data including identification of the selected k entries.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
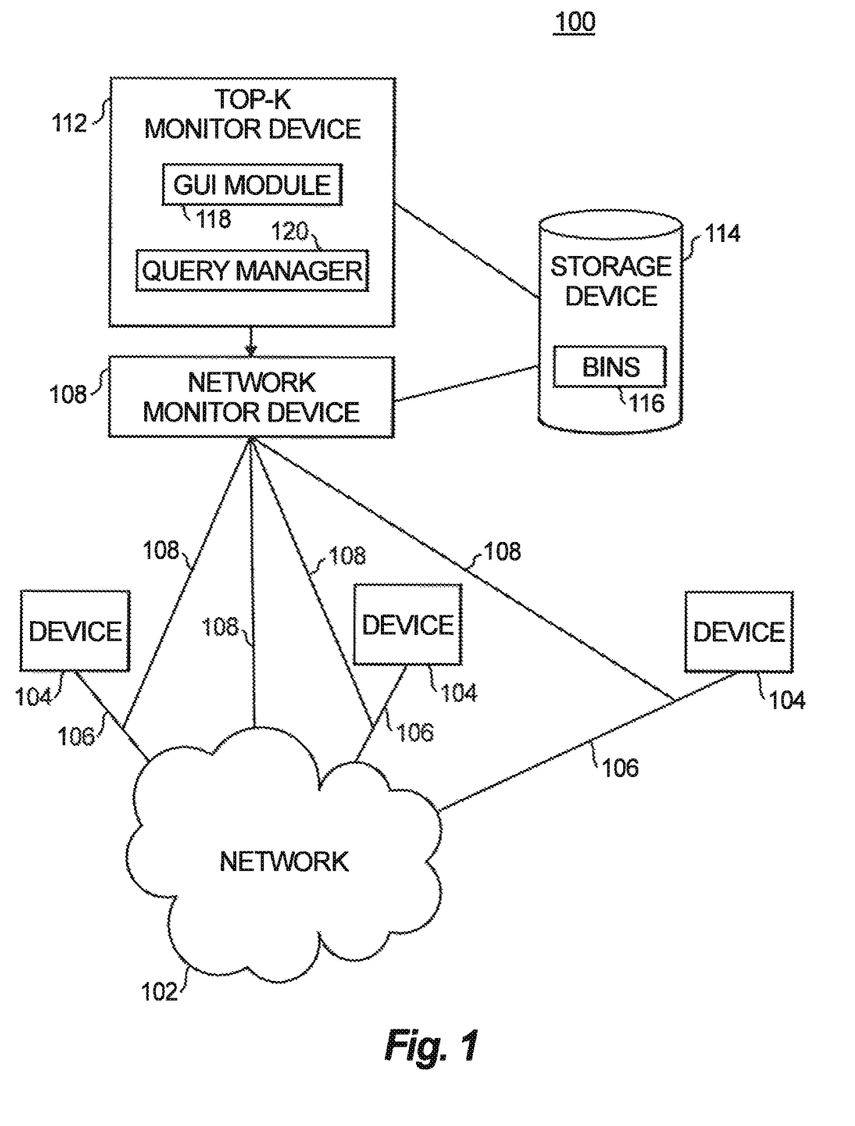
FIG. 1 illustrates a block diagram of an example network system in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a network system in accordance with the disclosure is shown in FIG. 1 and is designated generally by reference character 100. Other embodiments of the network system 100 in accordance with the disclosure, or aspects thereof, are provided in FIGS. 2-6, as will be described. The systems and methods described herein can be used to provide improved processing of large, streamed data sets, for example in network communication applications, without limitation to a data network context. The term large, streamed data set is defined as a large data set that is dynamic in response to a property, such as time, space, types of data sensed, or characteristics of data sensed, for example data sets related to data networks, transportation, biological sensing, weather sensing, geologic sensing, etc.

A system and method to store and combine apportioned event data associated with a large, streamed data set to enable handling queries for top count (also referred to as top-k) information that relates to a particular time interval is shown and described with respect to FIGS. 1-6. FIGS. 1-6 relate to network attacks detected in network traffic flowing through network system 100. However, system 100 and related methods can be applied to other contexts, such as wherein the large, streamed data set is generated by a different source, such as a network of sensors or computing devices, e.g., in a communication, transportation, biological, weather, geologic, astrologic context.

In the context shown and described with respect to FIGS. 1-6, event data associated with detection of an event is stored in bins that correspond to different time intervals. In embodiments, the event is a network event that indicates the presence of a network attack affecting one or more network traffic streams. The network traffic streams include a large, streamed data set, including a plurality of data packets. The event data is data included in the large, streamed data set that is associated with a detected event. For example, the event data can include data packets included in network traffic having a characteristic (e.g., traffic rate or volume) that exceeded a predefined threshold.

In other contexts, the event can indicate a phenomenon that occurs in a large, streamed data set. For example, the large, streamed data set can be output by geological sensors and the phenomenon indicated by the event can be movement of a tectonic plate. In another example, the large, streamed data set is output by distributed sensors of a transportation network, and the phenomenon indicated by the event can be congestion or schedule disruptions.

The event data associated with the large, streamed data set can be stored in bins that correspond to intervals or categories associated with another property associated with, for example, the source of the data, the entity being measured, or the measurement data. Examples of properties are space (e.g., data source location, measured distance, measured height) or characteristics (e.g., type of data source, type of data measured, physical property measurement, data quality, etc.). Each bin is associated with a property interval that has a unique combination of a start and end value that defines its property interval.

In the context shown and described with respect to FIGS. 1-4, a network event is detected by detecting a characteristic of the network traffic stream(s) that indicates a network attack. The disclosure is not limited to the context of detection of a network attack in network traffic stream(s), but can include other contexts in which an event is related to detection of a predefined characteristic associated with streaming data of some large, streamed data set.

In the context shown and described with respect to FIGS. 1-4, a query is handled for a selected time interval. In other contexts, queries can be handled for other selected intervals or categories associated with another property associated with, for example, the source of the data, the entity being measured, or the measurement data. The interval (e.g., time interval) can be arbitrarily selected by a user.

With reference to FIGS. 1-4, the top-k information can be used to indicate information about the source or destination of network traffic or about the network traffic itself that can indicate a network attack. Conventionally, top-k information can be requested and provided for an entire network traffic stream. The system and method shown and described herein provide the ability to store top-k information in individual bins associated with different nested time intervals associated with the network traffic stream. Queries can be received for an arbitrary time interval and resolved by combining the bins to satisfy the request. Queries can specify k to indicate what type of count if being requested, or k can be preset, such as by an administrator. Accordingly, queries can be submitted to obtain information about potential network attacks for a requested time interval.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, network system 100 includes a computer network 102. Devices 104 are coupled to the network 102 and can communicate with other devices 104 that are coupled to the network 102 or included in the network 102, such as for delivery of large amounts of data, e.g., streamed media, from one device 104 to another device 104. The network 102 can be, for example, a network such as the Internet, a private network, a different public network, a cellular network, a personal communication service (PCS) network, a public switched telephone network (PSTN), a wireless network, a wireless network, etc.

The devices 104 can be included in the network 104 or communicate with the network 104 and one another via one or more communication links 106. These communication links 106 can be wireless, wired, or a combination thereof. The devices 104 can be, for example, mobile computing devices, smart phones, servers, media servers, stationary computing devices, sensors, network devices, etc. In an example scenario, the devices 104 include a plurality of mobile or stationary computing devices operated by subscribers that subscribe to one or more media services, where in the media services can be provided by one or more media servers. Large amounts of data associated with a network events are streamed from the one or more media servers to the computing devices.

A network monitor 108 monitors network traffic that flows into or out of the network 102 for attack traffic, such as by monitoring network devices or links included in the network 102, devices 104, and/or the communication links 106.

The network monitor 108 includes hardware, firmware, and/or software components that are configured to monitor network traffic, which can include, for example, measuring, intercepting, capturing, copying, or inspecting a network traffic stream. Network monitor 108 can include central or distributed elements for performing tasks associated with the monitoring. These elements can be passive or active and include software, firmware, and/or hardware components, such as taps, probes, or port mirrors. These elements can be positioned inline, and/or remote relative to devices 104 and communication links 106.

The network monitor 108 can extract information (also referred to as event data) from the network traffic when a network attack is detected. The extracted information can include metadata associated with detected network events. Examples of the metadata parameters include source IP address, destination IP address, source port, destination port, source autonomous system number (ASN), destination ASN, source country, destination country, source geolocation data, destination geolocation data, and specified signature data. Each network event is associated with a detection time that indicates the time at which the network monitor 108 detected the network event. The metadata associated with a selected one of the metadata parameters can be tracked. For example, a count can be tallied for the number of times a particular member a particular IP address) of the selected metadata parameter (e.g., source IP address) detected. The count can be stored as frequency count value associated with the selected metadata parameter.

A top-k monitor device 112 is provided that stores event data, which includes the metadata associated with detected network attacks, in one or more appropriate bins 116 provided in storage device 114. The bins 116 are arranged hierarchically, e.g., in a nested configuration, with each bin corresponding to a different time interval. The bin(s) 116 that the detected event data is stored in are selected based on the detection time associated with the network event. The top-k monitor device 112 can track top-k data in the bins 116.

The plurality of bins 116 are configured to store metadata for a study period that begins at a reference tissue. The study period can extend to the present time so that the bins 116 are updated in real time. The bins 116 are hierarchically arranged to correspond to time intervals of different lengths. Thus each bin 116 has a unique combination of start time (relative to the reference time) and duration that corresponds to a unique time interval. Within the hierarchy, the duration of larger bins 116 can be exact multiples of the duration of smaller bins 116. In this fashion, the bins 116 can be nested.

For example, bins 116 provided for a study period beginning at a reference time until the present time may include multiple series of bins 116 that correspond to consecutive intervals, the bins 116 of each series having the same duration, the duration associated with bins 116 of the respective series being one hour, six hours, one day, and seven days. The series can be aligned with one another. For example, the beginning of the eighth bin of a series of bins having duration of one day is aligned with the following bins: the second bin of a series of bins having a seven day duration, the 29th bin of a series of bins having a six hour duration, and the 169th bin of a series of bins having a one our duration. The bins 116 can be conceptually nested, inner to outer, based on their duration as follows: one hour, six hours, one day, seven days.

When a network event is detected, associated new event data, including metadata values, are added to each of the bins 116 that correspond to a time interval that includes the detection time associated with the network event. If a metadata value is already stored in any of the bins 116, a frequency count value associated with the metadata values is incremented that bin 116. Each bin 116 is allowed to hold up to N entries. N can be tuned, such as by an administrator of the top-k monitor device 112. Once a bin 116 is full, the top-k monitor device 112 can remove a previously stored value from the bin to make room for the incoming metadata value.

The top-k monitor device 112 includes a query manager 118 and a top-k aggregator 120. The query manager 118 receives queries for top-k information associated with a specified time interval and optionally a specified k. In response to such a query, the top-k aggregator 120 selects the appropriate bins 116 that correspond to the requested time interval and determines aggregate top-k information based on an aggregation of the data stored in the selected bins. The query manager 118 outputs the aggregate top-k information for the requested time interval in response to the query.

The top-k monitor device 112 and the network monitor 108 can be integrated in a single device or share one or more hardware or software components. Additionally, the top-k monitor device 112 and the network monitor 108 can be implemented as physical or virtual devices. Whether implemented as a physical or virtual device, the top-k monitor device 112 uses a hardware processing device that executes software instructions, which enables performance of the disclosed functions.

The top-k monitor device 112, whether configured in combination or separate from the network monitor 108, includes a central processing unit (CPU), random access memory (RAM), and a storage medium, which can be connected through buses and used to further support the processing of the received packets. Programmable instructions can be stored in the storage medium and executed by the CPU to cause the CPU to perform operations described herein. The storage medium can also store analyzing criteria for detecting a network attack in network traffic using the aggregate top-k information.

In embodiments, at least portions of the network monitor 108 and/or the top-k monitor device 112 are external to the network 102. In embodiments, at least portions of the network monitor 108 and/or the top-k monitor device 112 are located within internal to network 102. At least portions of the network monitor 108 and/or the top-k monitor device 112 can be located at a network edge (inside or outside of the network 102) and/or deeper within the network 102.

In embodiments, the query manager 118 can include one or more interfaces that communicate with a user input device (e.g., a touchscreen, keyboard, cursor control device (e.g., mouse), etc.) and/or a user output device (e.g., display screen (e.g., the touchscreen), printer). The one or more interfaces can include a graphical user interface (GUI) that a user can operate for entering queries. In embodiments, the query manager 118 receives queries from another processing device or software module. The query manager 118 can provide the determined aggregate top-k information to the user output device or to the requesting processing device.

Figure 2:
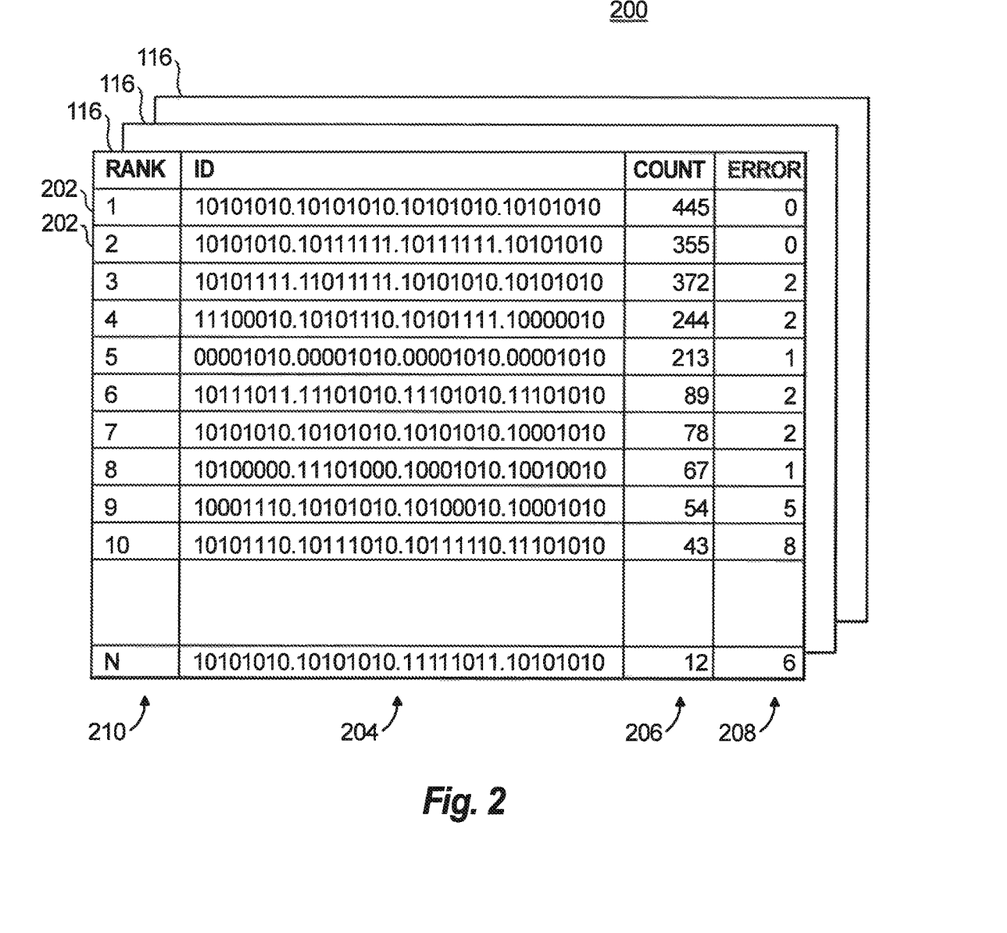
FIG. 2 illustrates a schematic diagram of an example storage structure stored by a storage device that is in data communication with a network monitor device and a top-k monitor device shown in FIG. 1, in accordance with an illustrative embodiment of the present disclosure.

With reference to FIG. 2, a data structure 200 configured to store partial information of interest associated with a large data set of streamed data elements is shown. In the example shown, the data elements include metadata values associated with network events detected in relation to the streamed data elements. In embodiments, the data elements can be streamed over another parameter, such as location or classification. Metadata values and count frequencies associated with the network events can be stored in the data structure 200, however the data structure 200 limits the amount of data that can be stored such that only partial information associated with the streamed network events is actually stored.

The data structure 200 includes multiple bins 116 that each includes up to N entries 202. FIG. 2 shows an example bin 116. Each entry 202 in the bin 116 entry has associated identification (ID) data 204, frequency count value data 206, error value 208, and rank data 210. An associated minimum and/or maximum possible count values can further be determined for and/or associated with each bin entry. The maximum possible count value is equal to the frequency count value. The minimum possible count value is equal to the difference between the frequency count value and the error value.

The identification data 204 identifies the member of a selected metadata parameter that is being counted. In the example shown, the identification data 204 is the source IP address associated with the detected network events. Each time a network event is detected, bins are selected that have a time interval that includes the detection time of the network event. A determination is made whether the detected bin already includes an entry having ID data 204 that matches (e.g., is the same as, or has a range that includes) the source IP address associated with the detected network event. Each selected bin that has such an entry increments the frequency count value by one and updates the error value based on a probabilistic error determination algorithm. The error value represents an estimated error associated with determining the frequency count value.

However, if any of the selected bins do not include an entry whose identification data 204 matches the source IP address associated with the detected network event, a new entry is created. If the maximum number of entries (N) has been reached, previously stored source IP address will be removed from the data structure to make room for the incoming value. Upon being added to the data structure the frequency count and error values associated with the source IP address's entry are initialized based on the add-entry algorithm.

As previously indicated, the bins are limited in size to N entries, which efficiently constrains the amount of data stored. Since only a portion of the data associated with the detected network events can be stored, a probabilistic approach is used to compensate for uncertainty that results from data that could not be stored in the bins due to their size constraints. An example probabilistic-based method for storing data associated with detected network events in bins of limited size is described in Metwally et al., *Efficient Computation of Frequent and Top-k, Elements in Data Streams*, Database Theory—ICDT 2005 (10th International Conference Proceedings, Edinburgh, UK, Jan. 5-7, 2005), which is incorporated by reference herein in its entirety.

When the query manager of the top-k monitor device receives a query requesting top-k information for a requested time interval, a plurality of bins 116 are selected that have corresponding time intervals that together describe requested time interval. Each of the selected bins 116 includes entries 202 that have respective associated frequency count and error values.

Since the frequency count and error values associated with the entries 202 are determined using probabilistic algorithms, top-k information for an aggregation of all of the selected bins 116 would not be accurately determined by simply adding frequency count values for entries in the selected bins 116 for entries 202 having the same ID information 204. Rather, the probability of an entry being included in a bin having limited capacity must be accounted for.

For example, if an entry is included as a highly ranked entry in only some of the bins that were selected to describe the requested time interval, a compensation action can be applied to account for the probabilistic nature of the probabilistic algorithm used to store the entries in the bins. In an embodiment, the top-k determination can include adding a substitute entry to a selected bin that did not include an entry that was highly ranked in others of the selected bins. The substitute entry can be associated with estimated frequency count, error, maximum possible count value and/or minimum possible count values. The estimated value can be based on at least one of possible maximum and possible minimum count values of the other entries in the selected bins that did not originally include the substitute entry. Thus, the compensation action can include taking into account error values associated with entries 202 in the selected bins. Example compensation actions are described below with reference to FIGS. 4A-5B.

With reference to FIGS. 1 and 2, the network monitor device 108, the top-k monitor device 112, and the bins 116 can be configurable, such as for tuning accuracy or the amount of data being stored. For example, N can be tuned, wherein a larger N can improve accuracy, and a smaller N can improve compactness in terms of storage space consumed in the storage device 114. In addition, the size of the intervals for each level of the bin hierarchy as well as the number of levels in the bin hierarchy can be tuned for query speed, indexing speed, accuracy, and/or the amount of data being stored. For example, adding levels to the hierarchy will reduce the number of bin aggregations needed to satisfy certain top-k queries, thereby increasing the query speed at the cost of indexing speed and the amount of data being stored.

Figure 3:
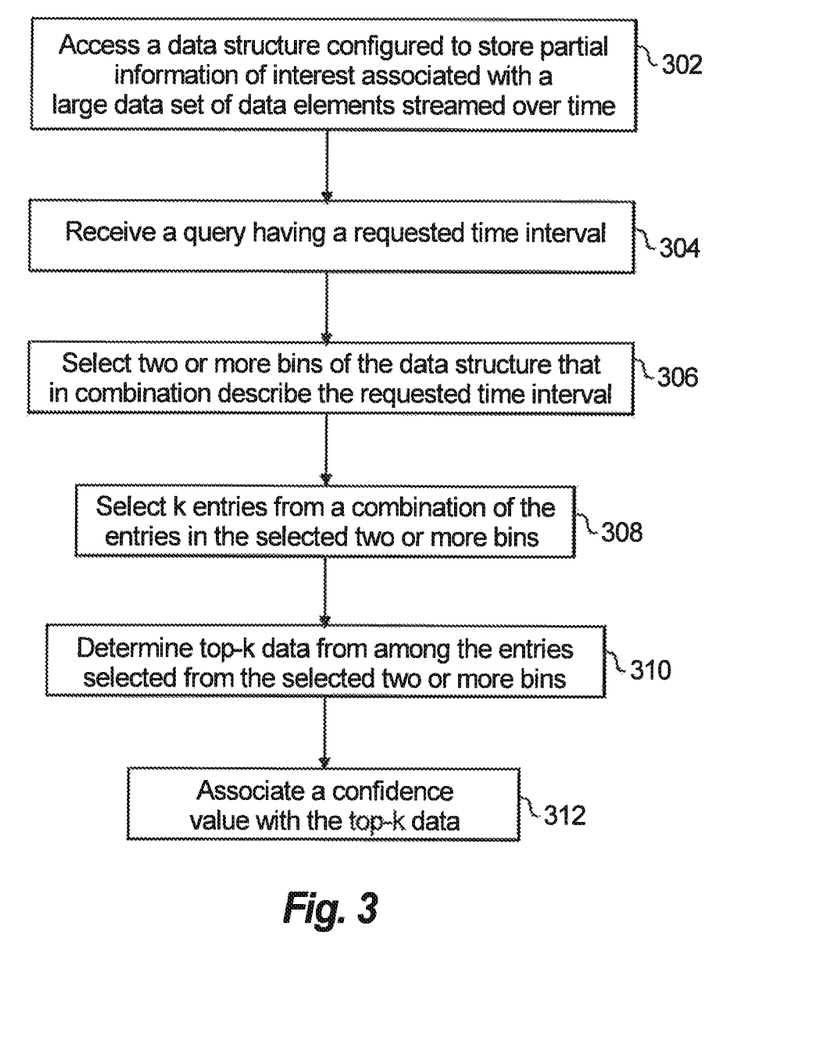
FIG. 3 illustrates a flowchart of an example method for handling top-k queries submitted to the top-k monitor device of the network system shown in FIG. 1, in accordance with an illustrative embodiment of the present disclosure.
Figure 4A:
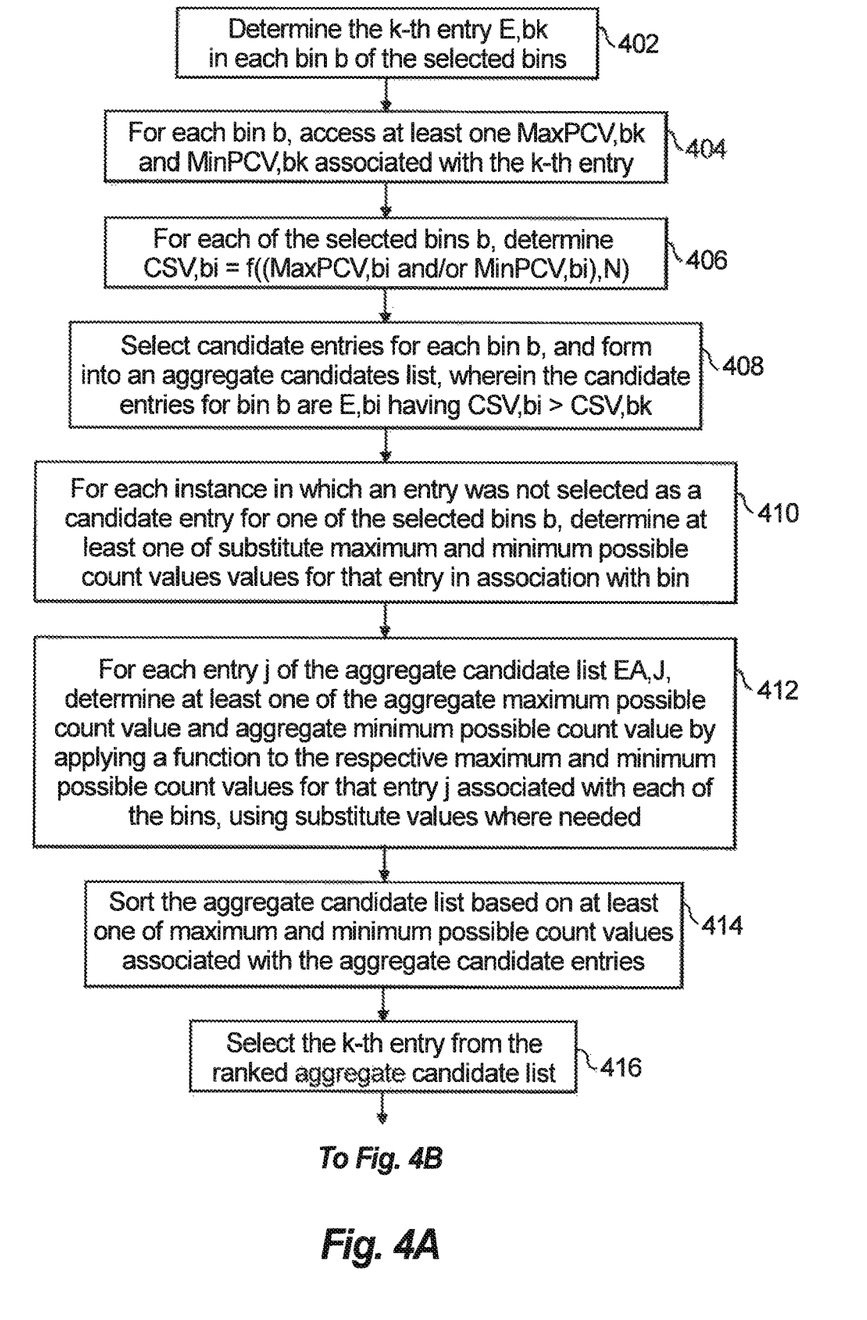
FIGS. 4A and 4B illustrate a flowchart of an example method for selecting candidates for top-k data and associating a confidence value with the top-k data.
Figure 4B:
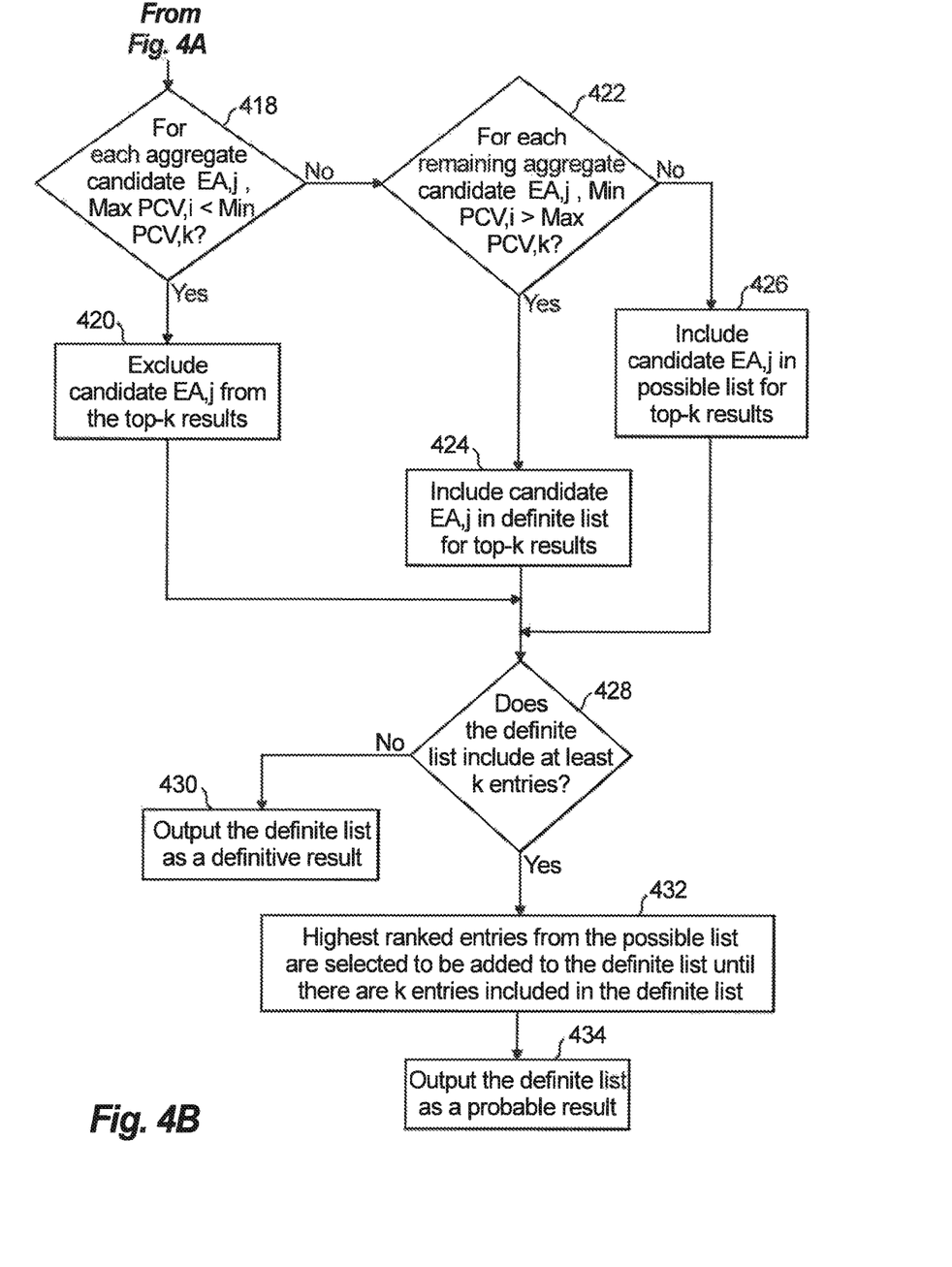

With reference now to FIGS. 3 and 4, shown are flowcharts demonstrating implementation of the various exemplary embodiments. It is noted that the order of operations shown in FIGS. 3 and 4 is not required, so in principle, the various operations may be performed out of the illustrated order or in parallel. Also certain operations may be skipped, different operations may be added or substituted, or selected operations or groups of operations may be performed in a separate application following the embodiments described herein.

With reference to FIG. 3, an example method of responding to a query for top-k network event entries of a large, streamed data set detected within a selectable time interval is shown and described. The selected time interval can be arbitrarily selected, e.g., by an operator or a processing device.

At operation 302, a data structure, such as data structure 200 shown in FIG. 2, is accessed that is configured to store partial information of interest associated with a large data set of data elements streamed over time. At operation 304, a query is received that requests top-k information for a requested time interval. At operation 306, two or more bins of the data structure, such as bin 116 shown in FIG. 2, are selected, such that the selected bins, in combination with one another, describe the requested time interval.

At operation 308, k entries from a combination of the entries in the selected bins are selected, which is described in greater detail below.

At operation 310, top-k data is determined from among the entries selected from the selected bins, which is described in greater detail below. At operation 312, a confidence value is associated with the top-k data, which is described in greater detail below. The confidence value represents a level of confidence in the top-k data.

With reference to FIG. 4, an example method for performing operation 308, 310, and 312 of FIG. 3 is shown, using the following notation:

N=number of selected bins (e.g., 3);
b=selected bin (e.g., 1, 2, 3)
$E,bi$=i-th entry in bin b
$C,bi$=frequency count value of the i-th entry in bin b ($E,bi$)
$R,bi$=error value of the i-th entry in bin b ($E,bi$)MaxPCV, $bi$=maximum possible count value of the i-th entry in bin b ($E,bi$.)
MinPCV, $bi$=minimum possible count value of the i-th entry in bin b ($E,bi$)

At a first stage, operations 402-408, candidates are identified to be included in an aggregate candidate list for each of the selected bins. At operation 402, the k-th entry $E,bk$ in each bin b of the selected bins is determined. The determination of the k-th entry is based on a sorted arrangement of the entries in each of the selected bins, wherein the entries in each respective bin are sorted based on at least one of the maximum and minimum possible count values associated with the respective entries.

At operation 404, for each bin b, at least one of the maximum and minimum possible count values MaxPCV,bk and MinPCV,bk associated with the k-th entry are accessed. The term "accessed" as used herein can include, for example, read, copied, received, retrieved, determined, or otherwise obtained, etc.

At operation 406, for each of the selected bins b, a candidate selection value (CSV) for each entry i of bin b is determined as a function of at least one of the maximum and minimum possible count values associated with the entry i and the value N, also expressed as:

$$CSV,bi = f((\text{MaxPCV},bi \text{ and/or } \text{MinPCV},bi),N).$$

In embodiments, CSV,bi=f(MaxPCV,bi and/or MinPCV, bi)/N.

In embodiments, CSV,bi=MaxPCV,bi/N.

At operation 408, candidate entries for each bin b are selected. The candidate entries for each bin b of the selected bins are candidate entries of $E,bi$ that satisfy the equation CSV,bi>CSV,bk. All of the candidate entries of each of the selected are combined into an aggregate candidate list. At a second stage, at operations 410-412, for each entry of the aggregate candidate list, at least one of an aggregate maximum and minimum possible count value is determined by performing a function upon at least one of the maximum and minimum possible count value associated with the entry for each of the selected bins. For example, the function can be, without limitation thereto, a summing function. However, due to the probabilistic nature of storing entries in bins that have a limited capacity, an entry may not have been selected as a candidate entry for each of the selected bins. In such a case, compensation for this probabilistic feature is performed. In the example method, a substitute entry having at least one of a substitute maximum possible count value and a minimum possible count value is provided as a place mark for that entry in any bin that it was not included as a candidate entry.

The substitute maximum possible count values can be determined as a function of the maximum possible count values associated with the other non-substitute aggregate candidate entries. In the present example, the function applied is the minimum function MIN, which determines the maximum possible count value of the other non-substitute aggregate candidate entries having the lowest value.

The substitute minimum possible count values can be determined as a function of the minimum possible count values associated with the other non-substitute aggregate candidate entries. In the present example, the function applied is the maximum function MAX, which determines the minimum possible count value of the other non-substitute aggregate candidate entries having the highest value.

Accordingly, at operation 410, for each instance in which an entry was not selected as a candidate entry for one of the selected bins b, if maximum possible count values are determined, the lowest of the maximum possible count values associated with the other non-substitute candidate entries in that bin b is used as a substitute value for the entry's substitute maximum possible count value. If minimum possible count values are determined, the highest of the minimum possible count values associated with the other non-substitute candidate entries in that bin b is used as a substitute value for the entry's substitute minimum possible count value.

In embodiments, the substitute maximum and/or minimum possible count values can be determined using an alternative method, such as determining a non-zero value based on a function of the maximum possible count values associated with the non-substitute candidate entries in bin b. At operation 412, for each entry j of the aggregate candidate list EA,j, at least one of the aggregate maximum possible count value and aggregate minimum possible count value are determined by applying a function, such as summing, to the respective maximum and minimum possible count values for that entry j associated with each of the bins, using substitute values where needed. In embodiments, the aggregate maximum and minimum possible count values associated with an entry j can be determined using a function other can summing.

At a third stage, operations 414-436, top-k values are selected from the aggregate candidate list and categorized. At operations 414, the aggregate candidate list is sorted based on at least one of maximum and minimum possible count values associated with the aggregate candidate entries. At operation 416, the k-th entry is selected from the ranked aggregate candidate list.

At operation 418, a determination is made for each aggregate candidate EA,j whether:

Max PCV,i<MinPCV,k

At operation 420, for each candidate EA,j for which the determination at operation 418 is positive, that candidate EA,j is determined to be excluded from the top-k results.

At operation 422, for each candidate EA,j for which the determination at operation 418 is negative, a determination made for the remaining aggregate candidates EA,j that were not determined at operation 420 to be excluded from the top-k results whether:

Min PCV,i>MaxPCV,k

At operation 424, for each candidate EA,j for which the determination at operation 422 is positive, then aggregate candidate EA,j is determined to be definitely included in the top-k results, forming a definite list of candidates definitely included in the top-k results.

At operation 426, the remaining aggregate candidates EA,j that were not determined at operations 422 and 424 to be excluded from or definitely included in the top-k results are determined to be possibly included in the top-k results, forming a possible list of candidates possibly included in the top-k results.

At operation 428, once all candidates EA,j are processed for inclusion or not in lists, a determination is made whether the definite list includes k entries. At operation 430, if the determination at operation 428 is positive, the definite list is output as a definitive result.

At operation 432, if the determination at operation 428 is negative, highest ranked entries from the possible list are selected to be added to the definite list until there are k entries included in the definite list. The possible list can be ranked based on at least one of the aggregate maximum and minimum possible count values. At operation 434, the definite list is output as a probable result.

Figure 5A:
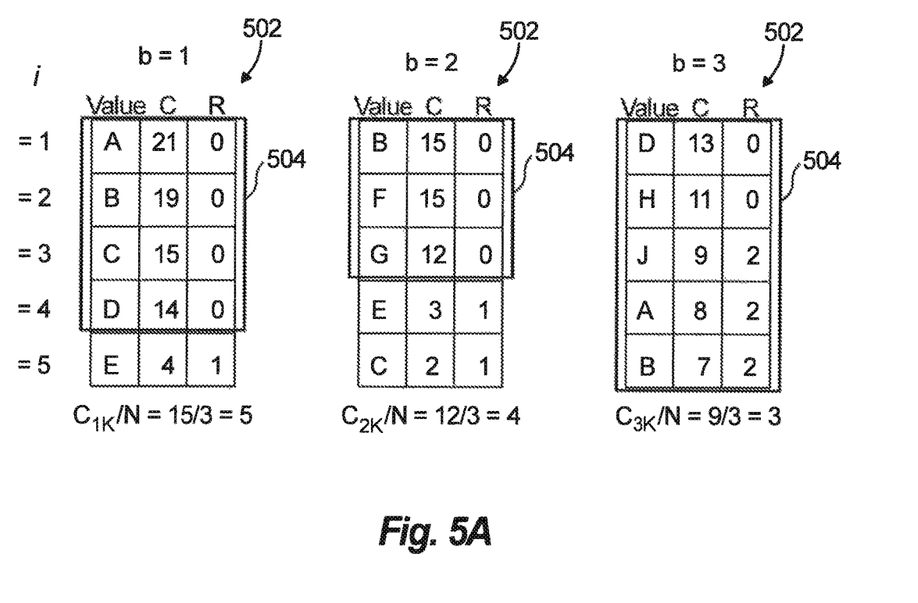
FIGS. 5A and 5B show example bins, candidate lists, and an aggregate candidate list based on implementation of the method indicated by the flowchart of FIGS. 4A and 4B.
Figure 5B:
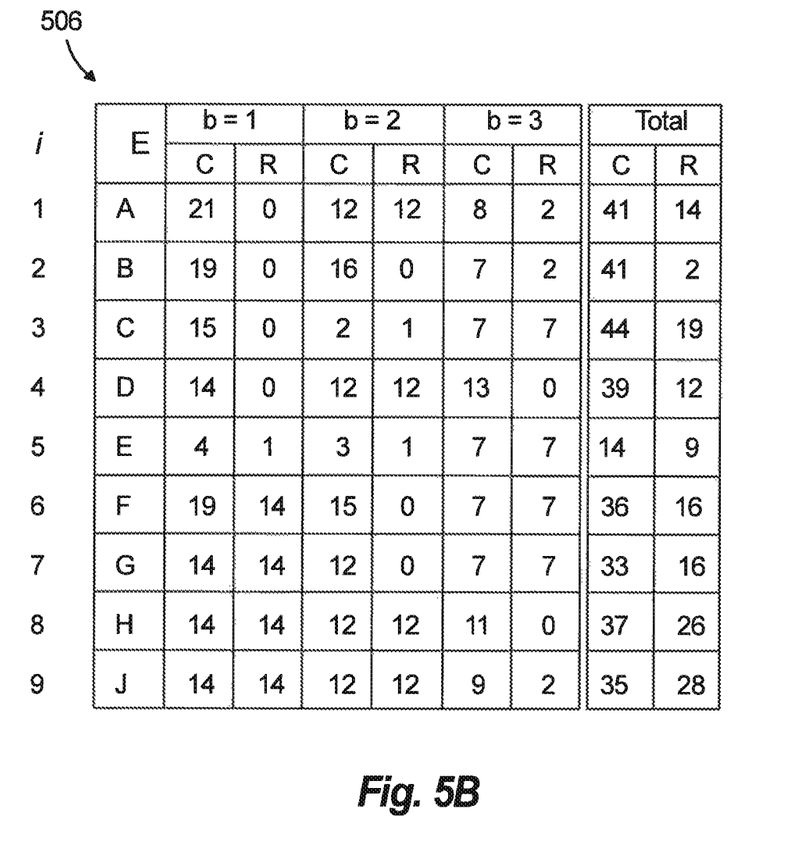

FIGS. 5A and 5B show an example of forming an aggregate candidate list for three selected bins 502, b=1, 2, 3, N=3, and k=3. For purposes of clarity, the bins include a small number of entries, however bins in an actual scenario could include a very large number of entries, theoretically only limited by the storage capacity and compute resources of the underlying system. This example uses frequency count (C) and error values (R) instead of maximum and minimum possible count values.

The candidate entries selected from each bin to be included in the aggregate candidate list 506 are designated by boxes 504. For bin b=1,C,1k/N=15/3=5. For bin b=2,C, 2k/N=12/3=4. For bin b=3,C,3k/N=9/3=3. In the aggregate candidate list 506, the C and R entries for F, G, H, and J for b=1 are 14, 14, since these entries were not included in the candidates selected from b=1 and wherein 14 was the lowest C value in the candidates selected from b=1. In a similar fashion, in the aggregate candidate list 506, the C and R entries for A, D, H, and J for b=2 are 12, 12; and the C and R entries for C, E, F, and G for b=3 are 7, 7.

Table I below includes pseudocode for a procedure that provides proof that formation of the aggregate candidate list and selection of top-k candidates from the aggregate candidate list is an accurate method for determining top-k data. /*

---

* First, quickly build a list of possible top-k candidates. Proof sketch that this list is a superset of the actual
* top-k list:
*
* * getTopCandidates will return every candidate in a bin that has a count greater than count divided by binCount
*     of the k-th element.
* * For every element E in the summed top-k of all bins (Summary):
*     1) Overall.E.count >= K-th(Overall).count
*         This is the definition of being in the overall top-k.
*     2) There will be at least one bin B where B.E.count is greater than E.count in all other bins
*         (even if "all other bins" is the empty set). In this bin:
*         2.1) B.E.count * binCount >= Overall.E.count
*             Because the overall count is the sum of counts across all bins, and no bin B' can have a count for E
*             that is greater than B.
*         2.2) K-th(Overall).count >= K-th(B).count

```
*            * If there is some element E' that is in the top-k for B but not the top-k overall,
then
*                   K-th(Overall).count >= Overall.E'.count >= B.E'.count >= K-th(B).count
*                   * Otherwise, the top-k elements overall are exactly the top-k elements for B.
Thus, one of the elements
*                   E' in the top-k for B will be the K-th(Overall), and thus:
*                   (K-th(Overall).count == Overall.E'.count) >= B.E'.count >= K-th(B).count
*            2.3) B.E.count * binCount >= K-th(B).count
*                   Combining (2.1), (1), (2.2)
*                   Therefore, the element will be included in getTopCandidates for B.
*     3) E will be in our candidate list.
*            Because we combine the top candidates from all bins, and from (2.3) there will
be at least one bin where
*            getTopCandidates returns E.
*/
```

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including in actions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the network monitor device 108 and/or top-k monitor device 112 shown in FIG. 1 may be implemented or executed by one or more computer systems. For example, network monitor device 108 and/or top-k monitor device 112 can be implemented using a computer system such as example computer system 602 illustrated in FIG. 6. In various embodiments, computer system 602 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 602 is only one example of a suitable system and is not intended to suggest any limitation as to the scope of use or functionality of embodiments of the disclosure described herein. Regardless, computer system 602 is capable of being implemented and/or performing any of the functionality set forth hereinabove.

Computer system 602 may be described in the general context of computer system-executable instructions, such as program modules, being executed by a computer system. Generally, program modules may include routines, programs, objects, components, logic, data structures, and so on that perform particular tasks or implement particular abstract data types. Computer system 602 may be practiced in distributed data processing environments where tasks are performed by remote processing devices that are linked through a communications network. In a distributed data processing environment, program modules may be located in both local and remote computer system storage media including memory storage devices.

Figure 6:
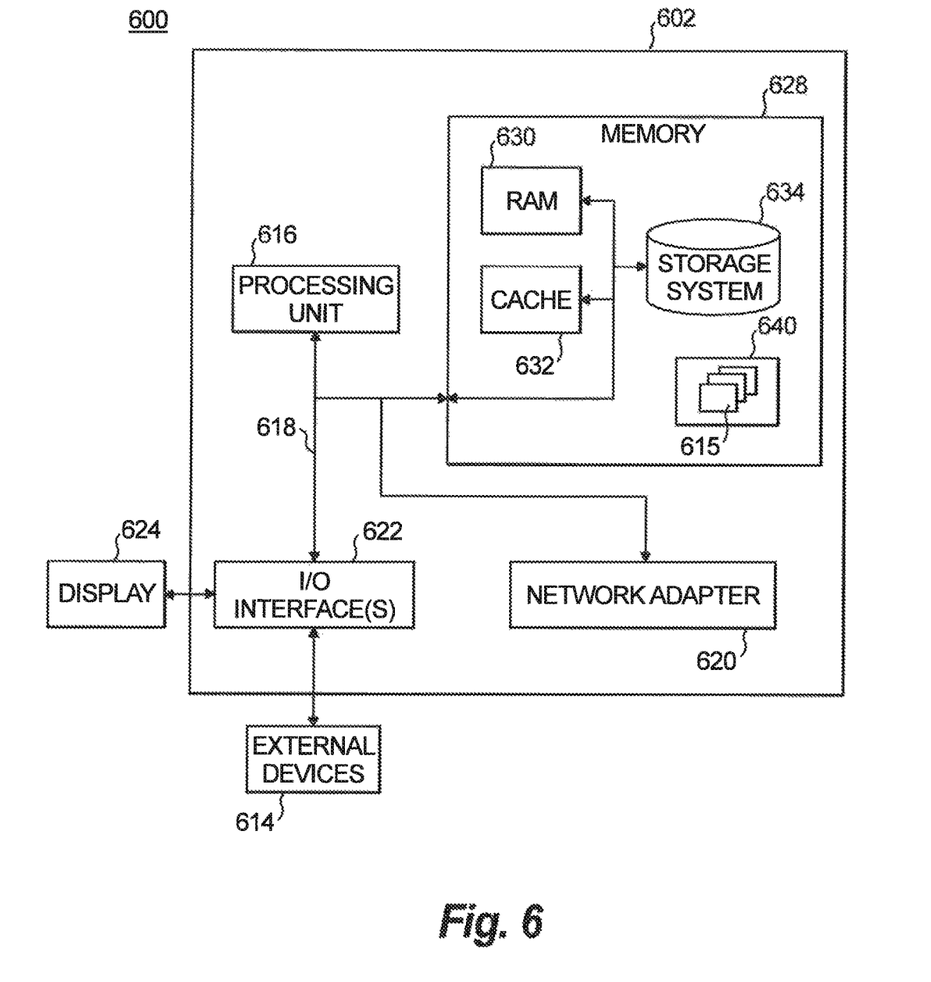
FIG. 6 illustrates a schematic block diagram of an example network computing device that implements at least one of the network monitor device and the top-k monitor device of the network system shown in FIG. 1, in accordance with an illustrative embodiment of the present disclosure.

Computer system 602 is shown in FIG. 4 in the form of a general-purpose computing device. The components of computer system 602 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 602 typically includes a variety of computer system readable media. Such media may be any available media that is accessible by network monitor device 108 and/or top-k monitor device 112, and it includes both volatile and non-volatile media, removable and non-removable media.

System memory 628 can include computer system readable media in the form of volatile memory, such as random access memory (RAM) 630 and/or cache memory 632. Computer system 602 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the disclosure.

Program/utility 640, having a set (at least one) of program modules 605, such as computer system 602, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 605 generally carry out the functions and/or methodologies of embodiments of the disclosure as described herein.

Computer system 602 may also communicate with one or more external devices 604 such as a keyboard, a pointing device, a display 624, etc.; one or more devices that enable a user to interact with computer system 602; and/or any devices (e.g., network card, modem, etc.) that enable network monitor device 108 and/or top-k monitor device 112 to communicate with one or more other computing devices. Such communication can occur via Input/Output (I/O) interfaces 622. Still yet, computer system 602 can communicate with one or more networks such as a local area network (LAN), a general wide area network (WAN), and/or a public network (e.g., the Internet) via network adapter 620. As depicted, network adapter 620 communicates with the other components of n 100 via bus 608. It should be understood that although not shown, other hardware and/or software components could be used in conjunction with computer system 602. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the top-k monitor device 112 include the ability to manage queries for a variety of property intervals, e.g., time intervals, associated with event data detected in a large, streamed data set. A user submitting queries to the top-k monitor device can obtain top-k data for a requested time interval in real time, including regularly updated top-k data for updated time intervals that can include the most recently streamed network data. Performance of the top-k processing can be tuned, such as to improve accuracy or storage efficiency. Since the bin data structure is of a fixed size, the maximum storage required by the system over time can be exactly determined.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer-implemented method in a network monitor device for detecting and preventing attacks on network coupled devices, the method comprising:
 providing a network monitor device coupled to a computer network, including:
  a memory configured to store a data structure;
  a processor upon execution of instructions is configured for:
  accessing a data structure configured to store partial information of interest associated with a large data set of data elements streamed over time, wherein
   the data structure is associated with a metadata parameter, the metadata parameter having a set of potential members,
   the data structure includes a plurality of bins, each bin associated with a unique time interval defined by an associated start time relative to a reference time and a time duration,
   each bin is configured to store a plurality of entries associated with respective members of the metadata parameter's set, each entry having at least one of an associated maximum value and minimum possible count value that are updated based on data elements of the data set that have an associated detection time when the data element was observed that corresponds to the bin's time interval, the maximum possible count value being a frequency count value associated with the entry, the frequency count value representing an estimated number of instances the associated member of the metadata parameter's set was observed in the time interval that corresponds to the bin, and the minimum possible count value being the difference between the count value and an error value associated with the entry, the error value representing an estimated error associated with determining the frequency count value, and the associated at least one maximum and minimum possible count values being determined using a probabilistic algorithm that accounts for errors introduced by storing entries associated with only a portion of data elements included in the large data set in the data structure;

receiving a query having a requested time interval;

selecting two or more bins of the data structure that in combination describe the requested time interval;

selecting k entries from a combination of the entries in the selected bins based on at least one of the maximum and minimum possible count values associated with entries of the selected bins; and determining top-k data, the top-k data including identification of the selected k entries for determining detection of a network attack.

2. The method of claim 1, wherein the large data set includes at least one of streamed network traffic and event data derived from the network traffic.

3. The method of claim 1, wherein the metadata parameter includes at least one of source IP address, destination IP address, source port, destination port, source autonomous system number (ASN), destination ASN, source country, destination country, source geolocation data, destination geolocation data, and specified signature data.

4. The method of claim 1, wherein the plurality of bins includes subsets of bins that include bins having respective associated time intervals of different duration, wherein a duration of time intervals associated with bins in one of the subsets having longer duration time intervals is an exact multiple of a duration of time intervals associated with other bins in the subset that have a shorter duration.

5. The method of claim 1, further comprising:

comparing the member of the metadata parameter of each data element of the large data set to the member of the metadata parameter associated with the respective entries in each bin having a time interval that corresponds to the detection time associated with the data element;

when the comparison indicates a match, incrementing the frequency count value associated with the entry;

when the comparison does not indicate a match and a storage limit that limits a number of entries that can be stored by the bin is not exceeded, adding an entry corresponding to the data element to the bin; and when the comparison does not indicate a match and the storage limit associated with the bin is not exceeded, replacing an entry in the bin having at least one of the lowest frequency count value min and the highest error value max with an entry that corresponds to the data element and setting the frequency count value associated with the newly added entry based on the frequency count value of the entry that was replaced.

6. The method of claim 5, further comprising, when the entry that corresponds to the data element replaces the entry in the bin, setting the error value associated with the newly added entry based on the frequency count value of the entry that was replaced.

7. The method of claim 1, further comprising:

ranking entries in each of the selected bins based on at least one of their associated possible count maximum and minimum possible count values;

determining the k-th entry of each of the ranked, selected bins;

determining for each entry of the selected bins a candidate selection value (CSV) that is a function of N and at least one of the entry's maximum and minimum possible count value;

selecting to be candidate entries of each bin those entries in the bin that have a CSV that is greater than the CSV of the k-th entry determined for the bin; and forming an aggregate candidate list having aggregate entries including the selected candidate entries for each of the selected bins.

8. The method of claim 7, further comprising:

determining at least one of aggregate maximum and minimum possible count values to be associated with each aggregate entry, the aggregate maximum and minimum possible count values being determined using either a respective maximum and minimum possible count values associated with the corresponding entry in each of the selected bins or a substitute non-zero value determined for the aggregate entry when there is no corresponding entry in any of the selected bins;

ranking the aggregate entries of the aggregate candidate list;

determining the k-th aggregate entry of the ranked aggregate candidate list; and selecting aggregate entries from the aggregate candidate list to be included in the top-k data based on the at least one of the aggregate maximum and minimum possible count values associated with the aggregate entries relative to at least one of the aggregate maximum and minimum possible count values associated with the k-th aggregate entry.

9. The method of claim 8, wherein the at least one of the aggregate maximum and minimum possible count values associated with each aggregate entry are determined by summing at least one of each corresponding maximum and minimum possible count value associated with the corresponding entry in each of the selected bins or the substitute non-zero value determined for the aggregate entry.

10. The method of claim 8, wherein the substitute non-zero value determined for an aggregate entry is determined based on the frequency count value associated with an aggregate entry having a corresponding entry in that bin that has the lowest associated frequency count value for that bin.

11. The method of claim 8, further comprising determining a confidence value associated with the top-k data that represents a level of confidence in the top-k data, the confidence value being determined based on a comparison between at least one of the aggregate maximum and minimum possible count values associated with the k-th entry of the aggregate candidate list and at least one of the aggregate maximum and minimum possible count values associated with each of the other aggregate entries.

12. A network monitor device coupled to a computer network for detecting and preventing attacks on network coupled devices, the device comprising:

a memory configured to store a data structure;

a processor disposed in communication with the memory, wherein the processor upon execution of instructions is configured to:

access a data structure configured to store partial information of interest associated with a large data set of data elements streamed over time, wherein the data structure is associated with a metadata parameter, the metadata parameter having a set of potential members, the data structure includes a plurality of bins, each bin associated with a unique time interval defined by an associated start time relative to a reference time and a time duration, each bin is configured to store a plurality of entries associated with respective members of the metadata parameter's set, each entry having at least one of an associated maximum value and minimum possible count value that are updated based on data elements of the data set that have an associated detection time when the data element was observed that corresponds to the bin's time interval, the maximum possible count value being a frequency count value associated with the entry, the frequency count value representing an estimated number of instances the associated member of the metadata parameter's set was observed in the time interval that corresponds to the bin, and the minimum possible count value being the difference between the count value and an error value associated with the entry, the error value representing an estimated error associated with determining the frequency count value, and the associated at least one maximum and minimum possible count values being determined using a probabilistic algorithm that accounts for errors introduced by storing entries associated with only a portion of data elements included in the large data set in the data structure;

receive a query having a requested time interval;

select two or more bins of the data structure that in combination describe the requested time interval;

select k entries from a combination of the entries in the selected bins based on at least one of the maximum and minimum possible count values associated with entries of the selected bins; and determine top-k data, the top-k data including identification of the selected k entries for determining detection of a network attack.

13. The device of claim 12, wherein the processor, upon execution of the instructions, is further configured to:

compare the member of the metadata parameter of each data element of the large data set to the member of the metadata parameter associated with the respective entries in each bin having a time interval that corresponds to the detection time associated with the data element;

when the comparison indicates a match, increment the frequency count value associated with the entry;

when the comparison does not indicate a match and a storage limit that limits a number of entries that can be stored by the bin is not exceeded, add an entry corresponding to the data element to the bin; and when the comparison does not indicate a match and the storage limit associated with the bin is not exceeded, replace an entry in the bin having at least one of the lowest frequency count value min and the highest error value max with an entry that corresponds to the data element and setting the frequency count value associated with the newly added entry based on the frequency count value of the entry that was replaced.

14. The device of claim 13, wherein the processor, upon execution of the instructions, is further configured to set the error value associated with the newly added entry based on the frequency count value of the entry that was replaced, when the entry that corresponds to the data element replaces the entry in the bin.

15. The device of claim 12, wherein the processor, upon execution of the instructions, is further configured to:

rank entries in each of the selected bins based on at least one of their associated possible count maximum and minimum possible count values;

determine the k-th entry of each of the ranked, selected bins; and determine for each entry of the selected bins a candidate selection value (CSV) that is a function of N and at least one of the entry's maximum and minimum possible count value;

select to be candidate entries of each bin those entries in the bin that have a CSV that is greater than the CSV of the k-th entry determined for the bin; and form an aggregate candidate list having aggregate entries including the selected candidate entries for each of the selected bins.

16. The device of claim 15, wherein the processor, upon execution of the instructions, is further configured to:

determine at least one of aggregate maximum and minimum possible count values to be associated with each aggregate entry, the aggregate maximum and minimum possible count values being determined using either a respective maximum and minimum possible count values associated with the corresponding entry in each of the selected bins or a substitute non-zero value determined for the aggregate entry when there is no corresponding entry in any of the selected bins;

rank the aggregate entries of the aggregate candidate list;

determine the k-th aggregate entry of the ranked aggregate candidate list; and select aggregate entries from the aggregate candidate list to be included in the top-k data based on the at least one of the aggregate maximum and minimum possible count values associated with the aggregate entries relative to at least one of the aggregate maximum and minimum possible count values associated with the k-th aggregate entry.

* * * * *